Oct. 15, 1940.  W. W. GIPSON ET AL  2,218,131
FISHING TOOL FOR WELLS
Filed Feb. 10, 1939

WILLARD W. GIPSON
FRANCIS N. FOSSATI
RICHARD H. LONG
INVENTORS

BY
ATTORNEYS

Patented Oct. 15, 1940

2,218,131

UNITED STATES PATENT OFFICE 2,218,131

FISHING TOOL FOR WELLS

Willard W. Gipson, Taft, Francis N. Fossati, Richmond, and Richard H. Long, Oakland, Calif.

Application February 10, 1939, Serial No. 255,710

2 Claims. (Cl. 294—1)

This invention relates to a device for recovering drilling tools and the like which have been lost at the bottom of a deep well bore, and particularly to a fishing tool which is adapted to be secured to the lost article by means of a flash weld performed by means of an electric current of high intensity flowing for a very short period of time.

During the drilling of deep wells by the rotary method the drill bit is carried at the lower end of a long string of drill pipe through which mud fluid is circulated to carry cuttings to the surface of the ground, and also to plaster up the sides of the bore hole to prevent intrusion of water or gas. In very deep wells the extreme length of drill pipe and the large forces which it is required to transmit often result in breakage of the drill pipe near the drill bit where it is very difficult to secure a fishing tool of the conventional type.

This invention comprehends broadly the provision of a pair of electrodes which may be lowered through the mud fluid to make contact with the so-called "fish" or object to be recovered, together with means for imposing an electric current of considerable intensity but of very short duration so that the electrodes will make a flash weld and thereby be firmly secured to the fish. It is contemplated that the electrodes and at least a part of the current control apparatus would be lowered in the bore hole by means of a steel cable, the latter serving to support the current carrying conductors to the electrodes and also serving to pull the fish out of the hole if and when it is caught.

It is an object of this invention to provide a fishing tool for removing metal parts which have become detached from the usual hoisting or drilling equipment in deep wells.

Another object is to provide a fishing tool which will utilize a momentary electric current of high intensity to fuse or flash weld a pair of electrodes to a piece of metal which is lost in the bottom of a deep well.

These and other objects and advantages of this invention will be further apparent from the following description and from the accompanying drawing, which forms a part of this specification and illustrates a preferred embodiment of this invention.

Figure 3:
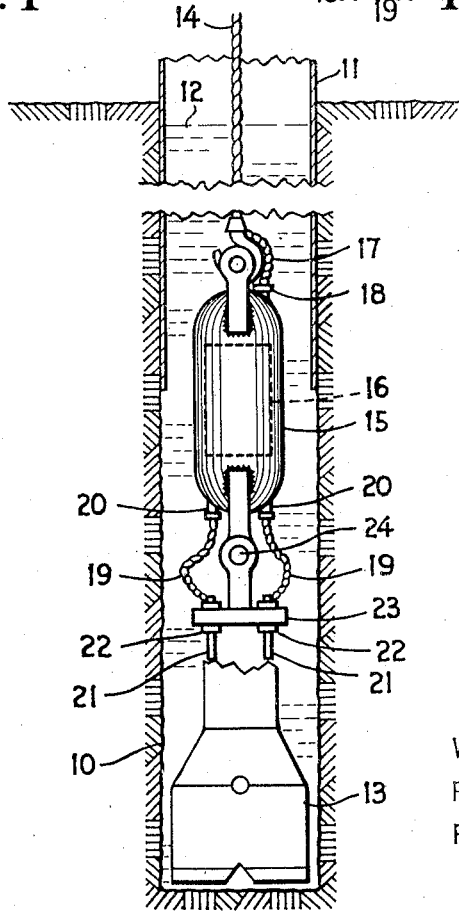
Figure 3 is a vertical sectional view of a well bore showing an arrangement of the electrodes for performing the flash weld, together with a transformer and a cable for raising and lowering the entire equipment in the well.

In the drawing, and particularly referring to Figure 3, reference numeral 10 designates a bore hole in the earth, a part of which may be provided with a casing 11. Below the lower end of casing 11 and surrounded by the usual mud fluid 12 is the fish or object 13 which it is desired to recover from the well. In the example shown, this is illustrated as being a drill bit to which is attached a short section of drill pipe or drill collar.

At the lower end of cable 14 is suspended a fluid tight housing 15 in which is mounted a step-down electrical transformer 16 supplied with relatively high primary voltage, for example 440–2300 volts A. C., by means of a flexible insulated cable 17 which enters housing 15 through a suitable stuffing box 18. The short low voltage secondary leads 19 emerge from housing 15 through stuffing boxes 20 and are respectively connected to electrodes 21. These latter are supported in insulating bushings 22 which pass through a member 23 movably connected or hinged at 24 to the transformer housing 15.

The apparatus just described is designed to pass freely downwardly through the mud fluid 12 in casing 11 to present electrodes 21 in such a manner that they will contact fish 13 in two places. With these contacts established, the primary of the transformer 16 is momentarily energized from a suitable electric power source, causing a very high current to flow through the secondary of the transformer and making a so-called flash weld between electrodes 21 and fish 13. This will ordinarily be found adequate to permit fish 13 to be drawn upwardly by cable 14 so that the usual drilling operations may be continued.

Figures 1, 2:
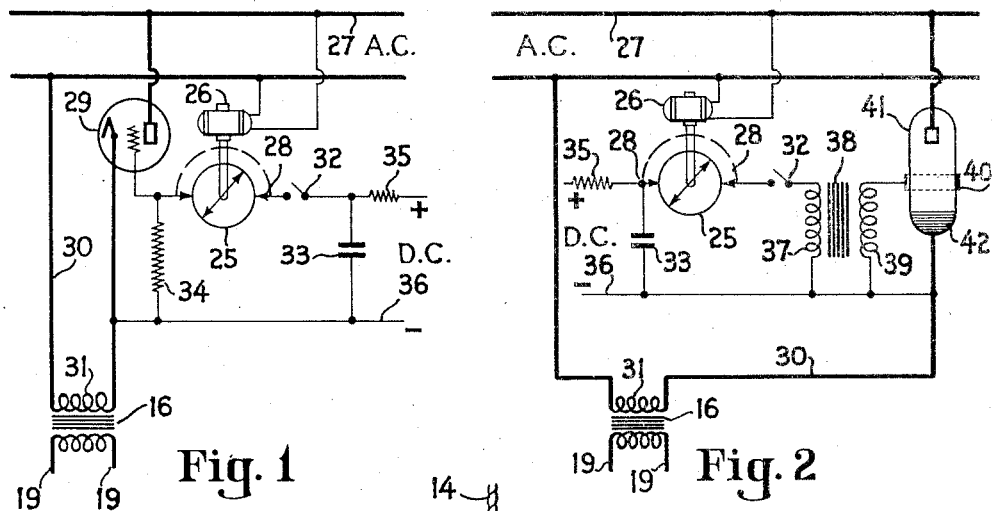
Figure 1 is a connection diagram of one form of control apparatus for imposing a momentary flow of current on the electrodes.
Figure 2 is a diagram of an alternative form of apparatus for controlling the electric current impulse delivered to the electrodes.

Referring now to Figure 1 which illustrates one type of control means for impressing the momentary current on the primary of transformer 16, reference numeral 25 designates a synchronous timer or commutator which is driven by a synchronous motor 26 from an alternating current power source 27. Timer 25 is provided with adjustable brushes 28 to be movable over 180 electrical degrees so that contact may be made at any desired point on the positive half cycle of the alternating current flow. Contact should be made by the timer only once during each complete cycle.

Timer 25 is used to control the grid circuit of a three-element electronic tube 29 which in turn controls the current now from the A. C. power source 27 through circuit 30 in which is connected the primary 31 of transformer 16. Circuit 30 includes the electric cable 17 of Figure 3.

Timer 25 is connected in series with a momentary contact switch 32 adapted to discharge condenser 33 through resistor 34. This discharge obviously takes place after the momentary contact switch is closed and at the instant that timer 25 is likewise closed. The voltage drop across resistor 34 energizes the grid of tube 29 and permits current to flow from the alternating current power source 27 through transformer 16 for the remainder of that particular half cycle. Resistor 35, which is in series with condenser 33 and the direct current power source 36, prevents the condenser from being charged to a value which will give the grid of tube 29 a high enough potential to make it conducting during the succeeding positive half cycle.

Figure 2 illustrates an alternative form of the control means just described and utilizes most of the same elements. Here again is a timer or commutator 25 driven from the alternating current power source 27 by a synchronous motor 26 and fitted with an adjustable brush rigging 28. Momentary contact switch 32 is adapted to discharge condenser 33 through the primary 37 of a small transformer 38. The secondary 39 of transformer 38 is connected to the igniter band 40 of a mercury tube 41, impressing a high voltage between the band and the mercury 42 to cause current from the alternating current power source 27 to flow through circuit 30 which includes the primary 31 of transformer 16.

Obviously there are many other means by which the momentary current flow to the primary of transformer 16 could be controlled, these two merely serving as examples. The principal feature of novelty in this invention is considered to be the provision of a plurality of electrodes adapted to be lowered into a well bore to make contact with a metal object therein and to be supplied by a momentary high current flow which may be unidirectional, to complete a flash weld with the object so that the latter may be removed from the well. Although specific constructions illustrating this invention have been described, it is understood that many modifications and changes could be made and all such that fall within the scope of the appended claims are embraced thereby.

We claim:

1. In a fishing tool utilizing a low voltage transformer having a heavy alternating current flow of short duration through its secondary to make a flash weld with a metallic object; a timer for predetermining the length of time of flow of the primary alternating current supply to said transformer comprising a normally non-conducting evacuated tube, a synchronous motor driven contactor connected to said tube, a source of direct current and a condenser adapted to be charged therefrom, and means for discharging said condenser through said contactor and said tube to cause the latter to become conducting to said primary alternating current supply to said transformer during a predetermined portion of a half cycle of said alternating current.

2. A fishing tool for deep wells comprising a transformer, a housing for said transformer adapted to be lowered into a well bore, means for transmitting a momentary high potential exciting current to the primary of said transformer from the top of said bore, a hinged yoke suspended from said transformer housing, a plurality of electrodes carried by said yoke, and flexible conductors extending from said transformer secondary to said electrodes, said yoke acting to equalize the strain on said electrodes after they have been flash welded to a fish in the well bore to raise the same to the surface.

WILLARD W. GIPSON.
FRANCIS N. FOSSATI.
RICHARD H. LONG.